E. J. BROOKS.
SEALING MECHANISM.
APPLICATION FILED AUG. 16, 1918.
1,290,707.
Patented Jan. 7, 1919.
3 SHEETS—SHEET 1.
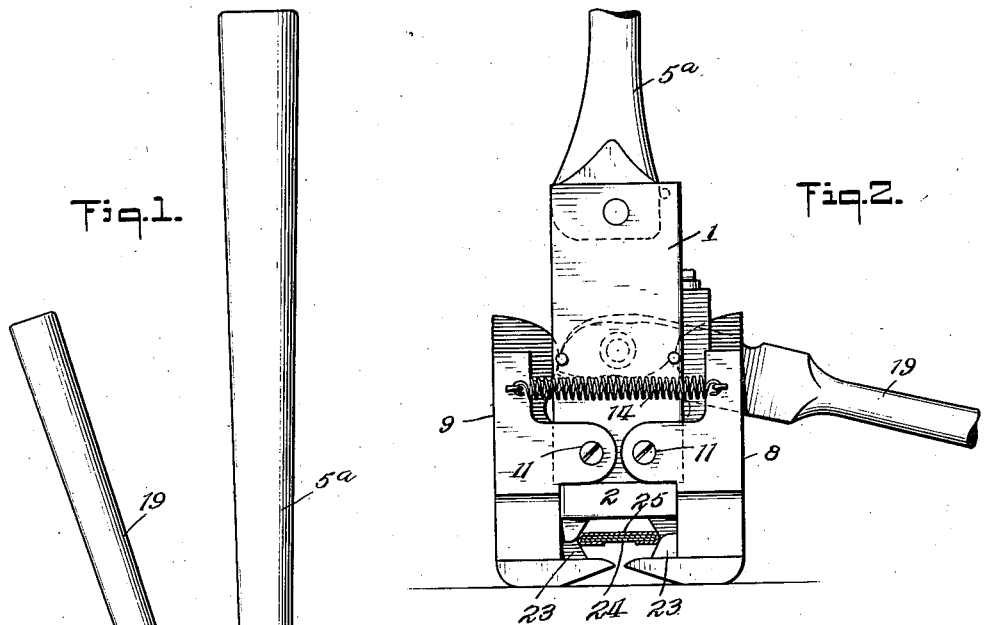
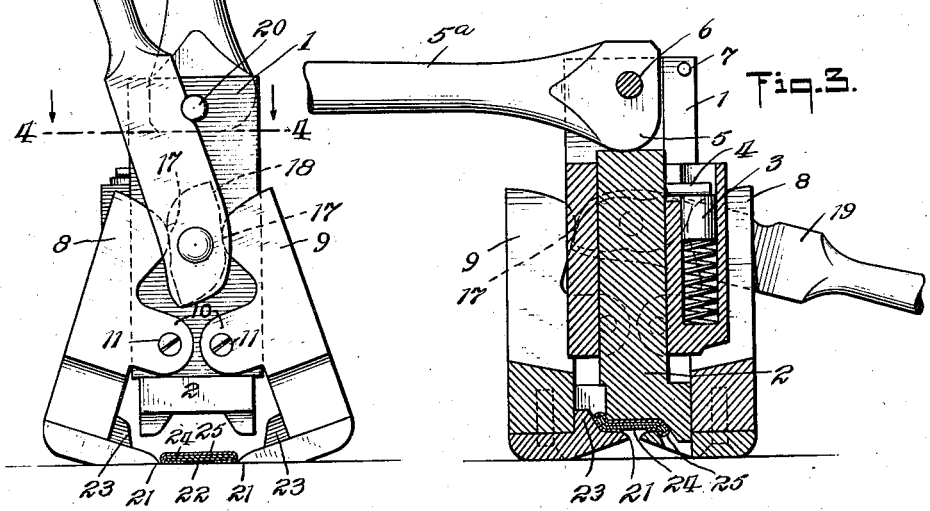
WITNESSES
INVENTOR
Edward J. Brooks
BY
ATTORNEYS

E. J. BROOKS.
SEALING MECHANISM.
APPLICATION FILED AUG. 16, 1918.

1,290,707.

Patented Jan. 7, 1919.
3 SHEETS—SHEET 2.

WITNESSES

INVENTOR
Edward J. Brooks
BY
ATTORNEYS

E. J. BROOKS.
SEALING MECHANISM.
APPLICATION FILED AUG. 16, 1918.
1,290,707.
Patented Jan. 7, 1919.
3 SHEETS—SHEET 3.
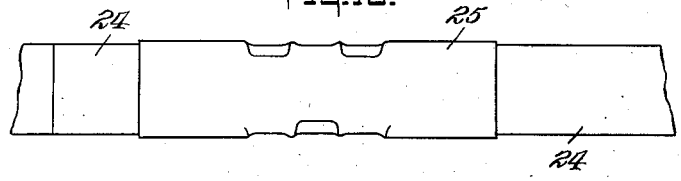
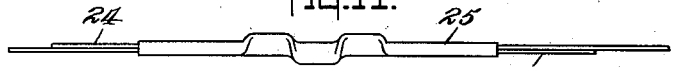
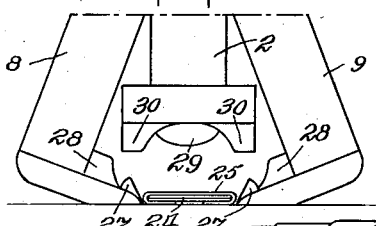
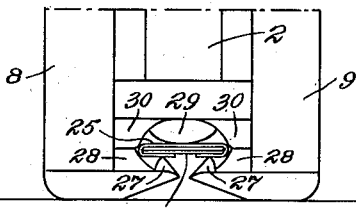
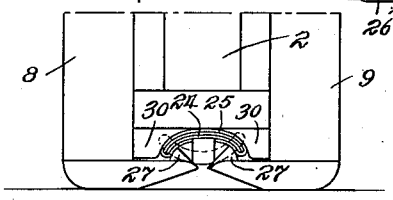
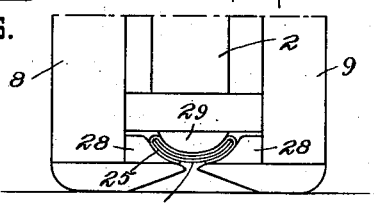
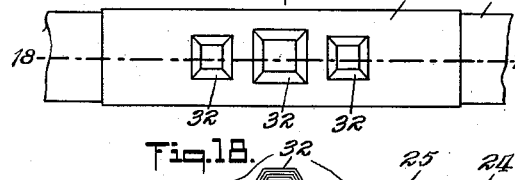
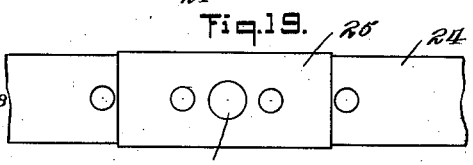
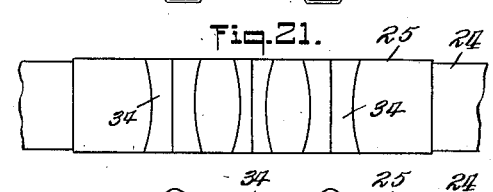
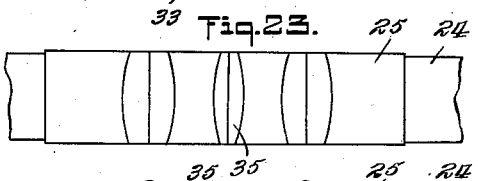
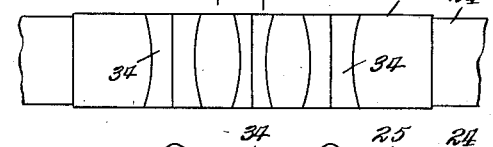
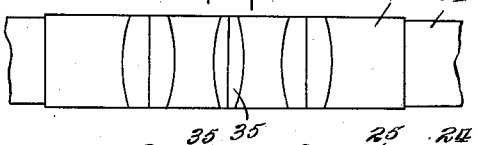
WITNESSES
INVENTOR
Edward J. Brooks
BY
ATTORNEYS

UNITED STATES PATENT OFFICE.

EDWARD J. BROOKS, OF EAST ORANGE, NEW JERSEY.

SEALING MECHANISM.

1,290,707.  Specification of Letters Patent.  Patented Jan. 7, 1919.

Application filed August 16, 1918. Serial No. 250,205.

*To all whom it may concern:*

Be it known that I, EDWARD J. BROOKS, a citizen of the United States, and a resident of East Orange, in the county of Essex and State of New Jersey, have invented certain new and useful Improvements in Sealing Mechanism, of which the following is a specification.

The present invention relates generally to sealing means and resides in certain devices whereby a seal, such as a strap and sleeve seal, may be elevated and centered with respect to die mechanism, it being particularly useful in instances where the strap is tightened around a container and where it is difficult to slip a member under the tightened strap.

In the accompanying drawings the invention is shown in several concrete and preferred forms, in which—

Figure 1 is a view in elevation of a sealing mechanism embodying the invention with the parts in the position they occupy before positioning and impressing the seal.

Fig. 2 is a view in elevation of the lower part of Fig. 1 from the side opposite to that shown in Fig. 1 and showing the parts in the position they occupy when the seal is positioned and before it is impressed.

Fig. 3 is a vertical sectional view of the elements shown in Fig. 2 with the parts in the position they occupy when the seal has been impressed.

Figs. 10 and 11 are plan and edge views of the seal produced by the invention of Figs. 1 to 9.

Fig. 12 is a diagrammatic view of a modified form of the invention for producing a modified form of seal with the parts in the position they occupy before positioning and impressing the seal.

Fig. 13 is a view similar to Fig. 12 showing the seal positioned but not impressed.

Fig. 14 is a view similar to Figs. 12 and 13 showing the seal impressed at one point.

Fig. 15 is a view similar to Fig. 14 showing the seal impressed at another point.

Fig. 16 is a perspective view of the seal produced by Figs. 12 to 15.

Figs. 17 and 18 are plan and edge views of a further modified form of seal produced by the invention.

Figs. 19 and 20 are views similar to 17 and 18 of another modified form of seal produced by the invention.

Figs. 21 and 22 are views similar to 17 and 18 showing still another modified form of seal produced by the invention.

Figs. 23 and 24 are views similar to Figs. 17 and 18 showing still another modified form of seal produced by the invention.

Figure 4:
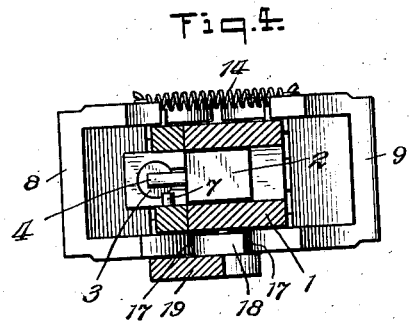
Fig. 4 is a horizontal sectional view on the line 4—4 of Fig. 1.
Figure 5:
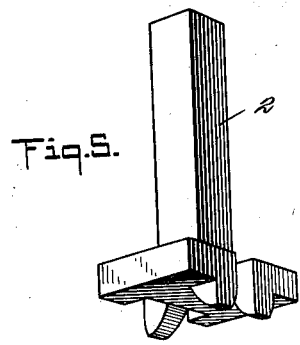
Fig. 5 is a perspective view of the upper die member.
Figure 8:
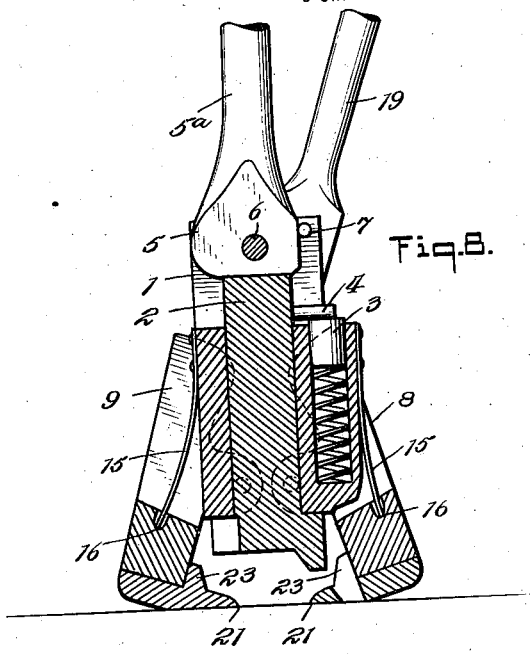
Figs. 8 and 9 are sectional views similar to Fig. 3 showing modified forms of the invention, with the parts in the position they occupy prior to the positioning and impressing of the seal.
Figure 6:
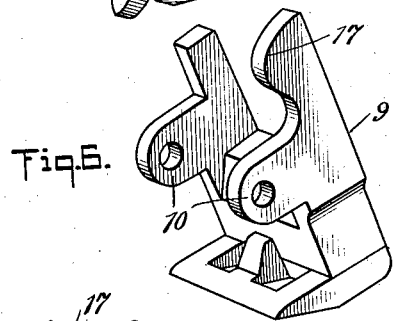
Figs. 6 and 7 are perspective views of the lower die members or jaws.
Figure 7:
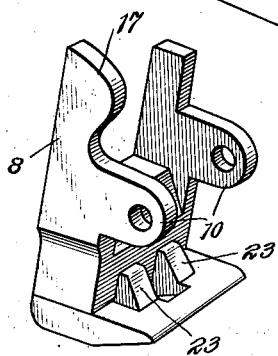

1 indicates a support or carrying member of any suitable form in which is mounted to slide vertically the upper die member 2 normally kept in its uppermost position by suitable means, such as the spring pressed plunger 3 acting against pin 4. Any suitable means such as the cam 5 having handle 5ᵃ, may be used to depress slide 2. This cam 5 is pivotally mounted on the pin 6 and is normally urged into the position shown in Figs. 1, 2 and 8 by plunger 3. 7 indicates a stop to limit the rotatable movement of cam 5.

Figure 9:
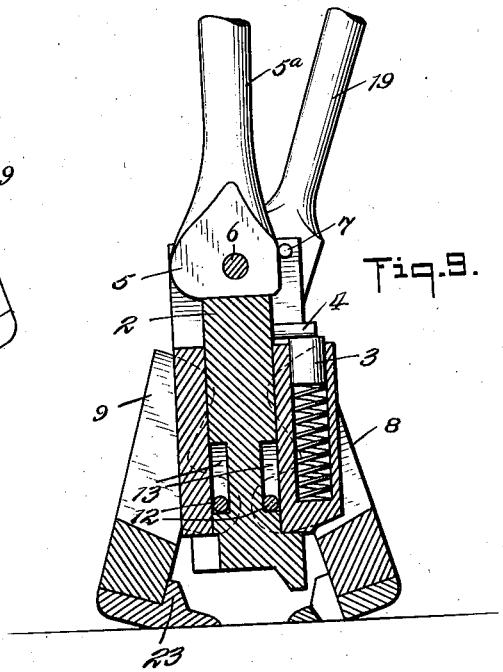

8 and 9 indicate two jaws pivotally mounted at a point intermediate of their ends on support 1 as by means of ears 10. In the form of the invention shown in Figs. 1 to 8 screws 11 threaded into each side of support 1 constitute the pivotal points of support for said jaws, but in Fig. 9 pins 12 are driven all the way through support 1, die member 2 being on this account cut away as at 13. Suitable means are provided for normally spreading jaws 8 and 9 apart. in Figs. 1, 2, 3 and 4 taking the form of a coiled pull spring 14 anchored on the opposed jaws at their upper ends and normally spreading apart their lower ends while in Fig. 8 leaf spring 15 riveted to the supporting member and bearing against abutments 16 of the jaws are used. The means for closing the jaws may vary, but as here shown, cam faces 17 are formed at the upper ends of the jaws, with which engage a rotatable cam 18 actuated by handle 19, the movement of which is limited in one direction by stop pin 20. At the lower end of the jaws are bevel faces 21 that engage under the side edges of a seal 22. These jaws also carry lower die member 23 whose inner faces are beveled as shown.

The seal which may be produced by the structure described may vary, but the invention is particularly adapted to be used in the formation of a seal such as is shown in Figs. 10 and 11. This seal consists of the overlapped ends 24 of a metallic strap and a sleeve member 25 of sheet material. These may be united by punching the metal through or by merely pressing the parts together. As here shown, the opposed edges of the sleeve are corrugated by the die members. It will be understood that the strap is passed around a box or other container and the ends of said straps are then overlapped and passed through the metallic sleeve. The strap is then tightened by known means, and when so tightened it is difficult to pass the lower member of die mechanism under the strap. The device is positioned over the seal with the parts arranged as in Fig. 1. Handle 19 is now manipulated thereby causing the jaws to engage under the side edges of seal 22, causing the latter to be elevated owing to the taper faces of the jaws and owing to the beveled inner faces of lower die members 23. At the time said seal is elevated, it is also centered with respect to the die mechanism. The parts now occupy the position shown in Fig. 2. Handle 5ª is now manipulated thereby moving upper die member 2 in a downward direction and impressing the seal.

In Figs. 12 to 15, the arrangement is slightly different in that here the corrugations 26 extend transversely across the width of the seal, and the metal is broken at the edges as shown in Fig. 16. In this instance, there are two sets of lower die members 27 and 28 and two sets of upper die members 29 and 30. The upper members 30 and lower members 27 are in the same vertical plane and coöperate to curve the seal transversely at one point, and lower members 28 and upper members 29 are located back of 27 and 30 but in the same vertical plane with regard to one another and coöperate to curve the seal in the opposite direction transversely at another point. The seal produced is shown in Fig. 16 where it will be seen that there is an intervening flat portion 31 between adjacent corrugations 26.

The variety of product that may be obtained by means of the device is almost endless and will depend upon the character of the seal and the shape of the die members. Thus in Figs. 17 and 18 square central depressions 32 are impressed in opposite directions with respect to the plane of the seal, and in Figs. 19 and 20 central opposed round depressions 33 are provided. In Figs. 21 and 22 transverse grooves 34 are produced, said grooves being preferably narrower at their central portion, and in Figs. 23 and 24 transverse grooves 35, wider at their central portion, are produced.

I claim:

1. Sealing mechanism comprising: a carrying member, a plurality of positioning jaws engaging under the edges of a seal to elevate and center the same with respect to die mechanism, means for actuating said jaws, die mechanism, and means for actuating said die mechanism.

2. Sealing mechanism comprising: a carrying member, a plurality of positioning jaws engaging under the edges of a seal to elevate and center the same with respect to die mechanism, means for actuating said jaws, lower die members carried by said jaws, an upper die member, and means for actuating said upper die member.

3. Sealing mechanism comprising: a carrying member, pivotally supported jaws engaging under the edges of a seal to elevate and center same with respect to die mechanism, means for actuating said jaws, die mechanism, and means for actuating said die mechanism.

4. Sealing mechanism comprising: a carrying member, pivotally supported jaws engaging under the edges of a seal to elevate and center same, lower die members carried by said jaws, means for actuating said jaws, an upper die member, and means for actuating said upper die member.

5. Sealing mechanism comprising: a carrying member, pivotally supported jaws engaging under the edges of a seal to elevate and center same with respect to die mechanism, means for actuating said jaws, reciprocating die mechanism, and means for reciprocating said die mechanism.

6. Sealing mechanism comprising: a carrying member, pivotally supported jaws engaging under the edges of a seal to elevate and center same, lower die members carried by said jaws, means for actuating said jaws, an upper die member having a reciprocating motion, and means for reciprocating said upper die member.

7. Sealing mechanism comprising: a carrying member, pivotally supported jaws swinging toward and away from each other and having opposed taper faces engaging under the edges of a seal to elevate and center same with respect to die mechanism, means for actuating said jaws, die mechanism, and means for actuating said die mechanism.

8. Sealing mechanism comprising: a carrying member, pivotally supported jaws swinging toward and away from each other engaging under the edges of a seal to elevate and center same, means normally swinging said jaws apart, rotatable means for bringing said jaws together, die mechanism and actuating means therefor.

9. Sealing mechanism comprising: a carrying member, pivotally supported jaws swinging toward and away from each other engaging under the edges of a seal to elevate and center same, means normally swinging said jaws apart, rotatable means for bringing said jaws together, reciprocating die mechanism, and rotatable actuating means for said die mechanism.

Signed at New York city, in the county of New York, and State of New York, this 14th day of August, 1918.

EDWARD J. BROOKS.